United States Patent
Inaba et al.

(10) Patent No.: US 10,210,895 B2
(45) Date of Patent: Feb. 19, 2019

(54) ANTI-CORROSION INSULATION LAYER FOR MAGNETIC RECORDING MEDIUM

(71) Applicant: HGST Netherlands B.V., Amsterdam (NL)

(72) Inventors: Hiroshi Inaba, Kanagawa (JP); Joe Inagaki, Kanagawa (JP); Hiroyuki Matsumoto, Kanagawa (JP); Hidekazu Kashiwase, Kanagawa (JP)

(73) Assignee: WESTERN DIGITAL TECHNOLOGIES, INC., Irvine, CA (US)

(*) Notice: Subject to any disclaimer, the term of this patent is extended or adjusted under 35 U.S.C. 154(b) by 266 days.

(21) Appl. No.: 14/662,527

(22) Filed: Mar. 19, 2015

(65) Prior Publication Data
US 2016/0275980 A1 Sep. 22, 2016

(51) Int. Cl.
*G11B 5/72* (2006.01)
*G11B 5/84* (2006.01)

(52) U.S. Cl.
CPC ............. *G11B 5/722* (2013.01); *G11B 5/72* (2013.01); *G11B 5/8408* (2013.01)

(58) Field of Classification Search
CPC .......... G11B 5/722; G11B 5/725; G11B 5/84; G11B 5/8408; G11B 5/73; G11B 5/732; G11B 5/743; G11B 5/746
See application file for complete search history.

(56) References Cited

U.S. PATENT DOCUMENTS

| 5,958,544 A * | 9/1999 | Usuki .................. G11B 5/7325 427/127 |
| 6,383,598 B1 * | 5/2002 | Fullerton ................ C22C 5/04 428/156 |
| 6,493,164 B1 * | 12/2002 | Kikitsu ...................... G11B 5/00 360/59 |
| 7,691,499 B2 | 4/2010 | Wu et al. |
| 8,053,097 B2 | 11/2011 | Li et al. |
| 8,628,866 B2 | 1/2014 | Singh et al. |
| 2006/0163195 A1 * | 7/2006 | Bandic ................. B82Y 10/00 216/22 |
| 2008/0213628 A1 | 9/2008 | Hailu et al. |
| 2009/0067093 A1 * | 3/2009 | Haginoya .............. B82Y 10/00 360/234.3 |
| 2009/0103401 A1 * | 4/2009 | Murakami ............... G11B 5/64 369/13.24 |
| 2009/0226765 A1 * | 9/2009 | Kuboki .................... G11B 5/65 428/846.7 |

(Continued)

OTHER PUBLICATIONS

Materials Properties Chart, https://www.ceramicindustry.com/ext/resources/pdfs/2013-CCD-Material-Charts.pdf, pp. 1-3, Jan. 2013.*

(Continued)

*Primary Examiner* — Holly C Rickman
(74) *Attorney, Agent, or Firm* — Kunzler, PC (57) ABSTRACT

A magnetic recording medium that includes a substrate, an insulation layer applied onto a surface of the substrate, and a magnetic layer applied onto the insulation layer. The insulation layer is made from a redox-corrosion-inhibiting material. In one embodiment, the insulation layer inhibits redox corrosion by inhibiting electron transfer through the insulation layer (e.g., inhibits electron transfer between the substrate and the magnetic layer).

19 Claims, 5 Drawing Sheets

(56) References Cited

U.S. PATENT DOCUMENTS

| | | |
|---|---|---|
| 2010/0188772 A1 | 7/2010 | Sasaki et al. |
| 2012/0092790 A1* | 4/2012 | Hellwig ................. G11B 5/746 360/59 |
| 2012/0177949 A1* | 7/2012 | Nakae ................. G11B 5/7315 428/836 |
| 2013/0314815 A1 | 11/2013 | Yuan et al. |

OTHER PUBLICATIONS

Diamond-Like Carbon Coatings, http://www.azom.com/article.aspx?ArticleID=623, Jul. 2001, pp. 1-11.*

Yanagisawa, et al., "Corrosion-resisting Co-Pt thin film medium for high density recording," Magnetics, IEEE Transactions on, Sep. 1983, pp. 1638-1640, vol. 19, No. 5, Abstract Only.

Zhang, et al., "Nanoscale protection for CoCrPt thin film magnetic recording media," Magnetics, IEEE Transactions on, Jul. 2001, pp. 1849-1851, vol. 37, No. 4, Abstract Only.

\* cited by examiner

ANTI-CORROSION INSULATION LAYER FOR MAGNETIC RECORDING MEDIUM

FIELD

This disclosure relates generally to electronic information storage devices, and more particularly to corrosion resistance for information storage devices.

BACKGROUND

Hard disk drives ("HDDs") are widely used to store digital data or electronic information for enterprise data processing systems, computer workstations, portable computing devices, digital audio players, digital video players, and the like. Generally, HDDs store data on a disk with a layer of magnetic material. A transducer head, e.g., read-write head, includes a writing component that magnetically polarizes areas or bits of the magnetic material with one or two polarities to encode either binary zeros or ones. Thus, data is recorded as magnetically encoded areas or bits of magnetic polarity. The direction of the magnetization points in different directions, which can be referred to as a positive state and a negative state. Each bit can store information (generally binary information in the form of either a 1 or a 0) according to the magnetic polarization state of the bit. Typically, bits are arranged along respective radially-adjacent (e.g., concentric) annular tracks of a disk. A single disk can include space for millions of tracks each with millions of bits. A transducer head also includes a reading component that detects the magnetic polarity of each bit or area and generates an electrical signal that approximates the magnetic polarity. The signal is processed to recover the binary data recorded on the magnetic material.

The disks of an HDD rotate as transducer heads hover over the respective disks to read data from and write data to the disks. Many conventional HDD disks include one or more layers of magnetic material applied over a substrate. In addition to the magnetic material, certain HDD disks also include magnetic conditioning sub-layers that stabilize the magnetic polarity of each magnetic bit and otherwise improve the functionality of the HDD. However, the magnetic material and/or the magnetic conditioning sub-layers may react with the substrate, or at least with trace impurities in the substrate, and may produce corrosion byproducts. These corrosion byproducts not only compromise the integrity and stability of the magnetic material, the corrosion byproducts may also migrate to the surface of the HDD disk, thus potentially causing read-write head crashes and/or sticking, which adversely affects the overall operation of the HDD.

SUMMARY

A need exists for an apparatus and system that inhibits corrosion of magnetic media. The subject matter of the present application has been developed in response to the present state of HDD art, and in particular, in response to problems and needs in the art that have not yet been fully solved by currently available HDDs.

According to one embodiment, disclosed here is a magnetic recording medium that includes a substrate, an insulation layer applied onto a surface of the substrate, and a magnetic layer applied onto the insulation layer. The insulation layer is made from a redox-corrosion-inhibiting material.

According to one implementation, magnetic layer includes a magnetic conditioning sub-layer and a magnetic recording sub-layer, with the magnetic conditioning sub-layer positioned between the insulation layer and the magnetic recording sub-layer. In another implementation, the insulation layer has an electrical resistivity of at least 1,000 Ohm*cm. The thickness of the insulation layer may be between about 1 nm and 100 nm. Also, the insulation layer may be made from a diamond-like carbon film and/or a silicon nitride film, among others.

In yet another implementation, insulation layer inhibits the redox corrosion by inhibiting electron transfer through the insulation layer. For example, the insulation layer may inhibit oxygen extraction across the insulation layer from trace water adhering to the substrate.

Also disclosed herein is one embodiment of a method for manufacturing a magnetic recording medium. The method includes providing a substrate, applying an insulation layer onto a surface of the substrate, and applying a magnetic layer onto the insulation layer. As mentioned above, the insulation layer generally inhibits redox corrosion of the magnetic recording medium. In one implementation, applying the magnetic layer first includes applying a magnetic conditioning sub-layer over the insulation layer and then applying a magnetic recording sub-layer over the magnetic conditioning sub-layer. In another implementation, the insulation layer has an electrical resistivity of at least 1,000 Ohm*cm. The thickness of the insulation layer may be between about 1 nm and 100 nm. Also, the insulation layer may be made from a diamond-like carbon film and/or a silicon nitride film, among others.

In one implementation, the insulation layer inhibits the electrical redox corrosion by inhibiting electron transfer through the insulation layer. For example, the insulation layer may inhibit oxygen extraction across the insulation layer from trace water adhering to the substrate and/or may inhibit oxidation of the magnetic layer.

According to yet another embodiment, disclosed herein is a hard disk drive. The hard disk drive includes a substrate, an insulation layer applied onto a surface of the substrate, a magnetic layer applied onto the insulation layer, a protective layer applied onto the magnetic layer, and a lubrication layer applied onto the protective layer. The magnetic layer includes a magnetic conditioning sub-layer applied onto the insulation layer and a magnetic recording sub-layer applied onto the magnetic conditioning sub-layer. The insulation layer is made from a redox-corrosion-inhibiting material that inhibits redox corrosion of the magnetic recording medium by inhibiting electron transfer between the magnetic layer and the substrate.

In one implementation, the insulation layer of the hard disk drive has an electrical resistivity of at least 1,000 Ohm*cm. The thickness of the insulation layer may be between about 1 nm and 100 nm. Also, the insulation layer may be made from a diamond-like carbon film and/or a silicon nitride film, among others. In yet another implementation, the insulation layer inhibits the redox corrosion by inhibiting electron transfer through the insulation layer. For example, the insulation layer may inhibit oxygen extraction across the insulation layer from trace water adhering to the substrate and/or may inhibit oxidation of the magnetic layer.

Reference throughout this specification to features, advantages, or similar language does not imply that all of the features and advantages that may be realized with the present disclosure should be or are in any single embodiment. Rather, language referring to the features and advantages is understood to mean that a specific feature, advantage, or characteristic described in connection with an embodiment is included in at least one embodiment of the subject matter disclosed herein. Thus, discussion of the features and advantages, and similar language, throughout this specification may, but do not necessarily, refer to the same embodiment.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the subject matter of the present application will be described and explained with additional specificity and detail through the use of the accompanying drawings, in which.

DETAILED DESCRIPTION

Figure 1:
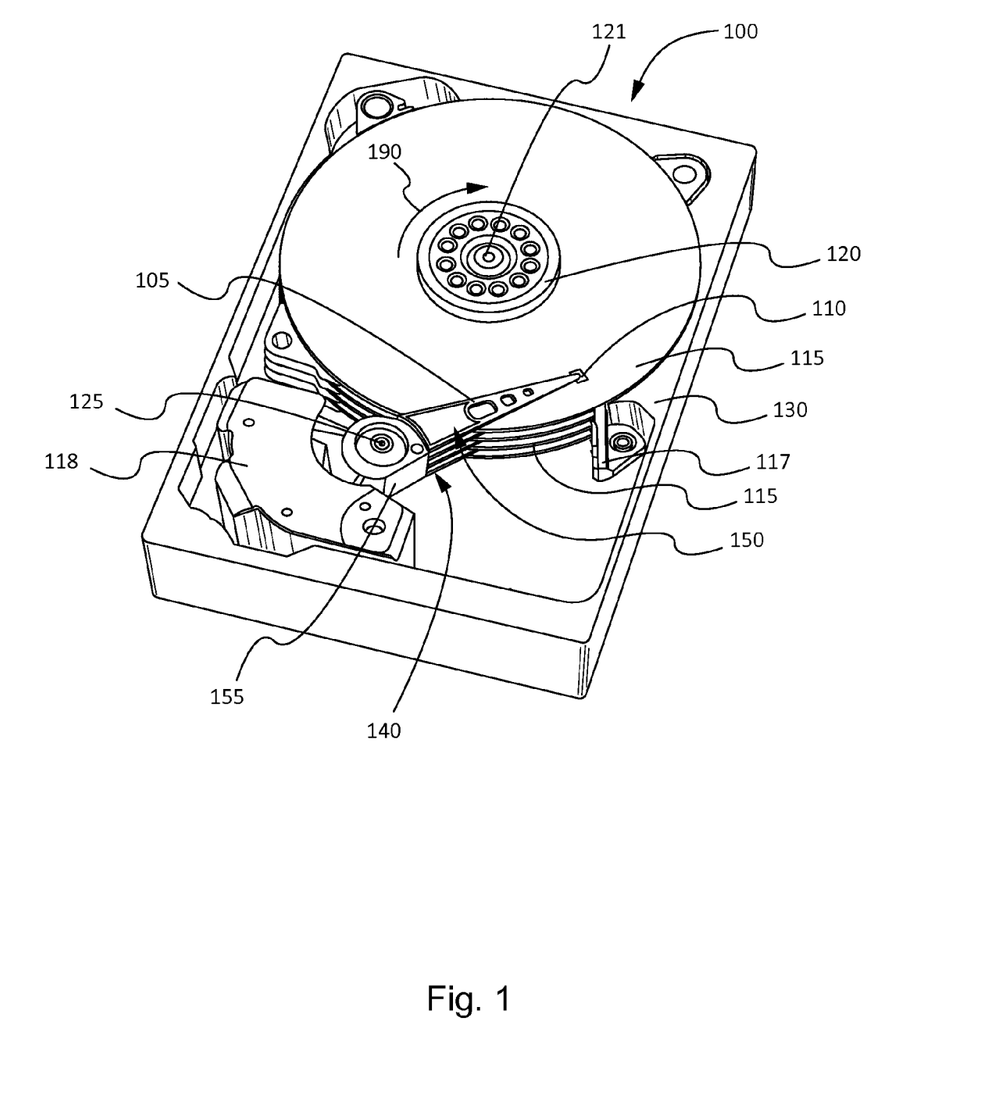
FIG. 1 is a perspective view of a hard disk drive shown with a cover removed, according to one embodiment.

Referring to FIG. 1, a magnetic storage device 100, according to one embodiment, is depicted as a hard disk drive ("HDD"). The HDD can be configured similarly to a conventional HDD as depicted generally in the illustrated embodiments. Alternatively, the HDD can be configured similarly to a so-called hybrid HDD that includes a combination of flash media and magnetic disk media. In yet other embodiments, the magnetic storage device 100 can be another type of magnetic storage device, or yet another type of data storage device, such as an optical recording device. Basically, the HDD 100 includes an actuator assembly 140, one or more disks 115, a spindle 121 driven by a spindle motor, and a base 130. The base 130 forms part of a housing, shown with a cover removed, that contains internal components of the HDD within the housing.

The actuator assembly 140 includes a plurality of armatures 105 coupled to a base 155, transducer heads 110, an actuator 118, a yolk assembly, and a spindle 125. Each transducer head 110 is secured to an end portion of a respective armature 105 (a second transducer head attached to each armature is not shown). Although the HDD 100 is shown having four armatures 105, one transducer head 110 per armature, four disks 115, and one yolk assembly, any number of armatures, heads, disks, and yolk assemblies may be employed.

The armatures 105 extend parallel to each other away from the base 155 to cantilevered end portions. Each armature 105 is a relatively thin plate-like element, which has a width that, in certain implementations, decreases in a direction extending away from the base 155. The armatures 105 are spaced apart vertically (e.g., top-to-bottom direction) such that a disk 115 can be positioned between adjacent armatures. In some instances, the armatures 105 are spaced an equal distance apart from each other. Each armature 105 defines a top surface and a bottom surface that opposes the top surface. In certain implementations, the top and bottom surfaces oppose each other when they define generally opposite sides of the corresponding armature 105. According to certain implementations, the top and bottom surfaces oppose each other when the top and bottom surfaces are parallel to each other, and spaced apart from each other by a thickness of the corresponding armature 105. The opposing surfaces can, but need not, be flat. The armatures 105 may include apertures for attachment of other components or for weight saving purposes. The apertures can extend from the top surface to the bottom surface of each armature. In some embodiments, the armatures 105 are integrally formed with the base 155 such that they form a monolithic one-piece construction with the base. In other embodiments, the armatures 105 are formed separate from the base 155 and coupled to the base in a separate processing step via any of various coupling techniques.

The yolk assembly includes coil supports and a coil coupled to the coil supports. The coil supports can be arms that are coupled to and extend away from the base 155. The coil supports are spaced-apart to support the coil between the coil supports. Although the coil supports extend only partially around a periphery of the coil, in some implementations, the coil supports may extend entirely around a periphery of the coil. Like the armatures 105, each coil support defines a top surface and a bottom surface that opposes the top surface. In some embodiments, the coil supports are integrally formed with the base 155 such that they form a monolithic one-piece construction with the base. In other embodiments, the coil supports are formed separate from the base 155 and coupled to the base in a separate processing step via any of various coupling techniques.

The coil includes an electrically-conductive wire wrapped about itself in a coiled configuration. The actuator 118 interacts with the coil to rotate the coil, as well as the base 155 and armatures 105, about the spindle 125. In one implementation, the actuator 118 passes current through the coil 171, which results in a torque applied to the actuator. The base 155 includes an aperture that receives the spindle 125. The aperture is configured to retain the spindle 125 and allow rotation of the base 155 relative to the spindle.

The armatures 105, base 155, and coil supports are made from a substantially rigid material. For example, in one embodiment, one or more of the armatures 105, base 155, and coil supports is made from a metal, such as aluminum. In other embodiments, one or more of the armatures 105, base 155, and coil supports is made from another substantially rigid material, such as ceramic, composite, polymer, and the like.

The spindle 121 is operably connected to the base 130 via the spindle motor, which is coupled to the base. The spindle 121 is co-rotatably coupled to the spindle motor such that the spindle motor rotatably drives the spindle. Accordingly, the spindle 121 can be considered to be part of or integral with the spindle motor. The disks 115 are operably connected to the spindle 121 via respective hubs 120 fixedly secured to respective disks and co-rotatably coupled to the spindle. In this manner, the spindle 121 defines a central axis of each disk 115. As the spindle 121 rotates, the disks 115 correspondingly rotate as indicated by directional arrow 190. Accordingly, the spindle motor can be operatively controlled to rotate the disks 115 a controlled amount and at a controlled rate. The disks 115 can include magnetic recording media organized into a plurality of tracks that store data.

As the disks 115 rotate, the actuator 118 positions the armatures 105 and the heads 110 connected to each armature, such that the heads are positioned over a specified radial area of the disks for read or write operations. In an idle mode, the actuator 118 is controlled to position the armatures 105 radially outwardly such that each head is parked or unloaded onto a ramp support 117 secured to the base.

The HDD 100 may also include an electrical hardware board mounted to the base 130. In this manner, the electrical hardware board is on-board or contained within the HDD 100, as opposed to forming part of an electrical device external to or separate from the HDD. Generally, the electrical hardware board includes hardware and/or circuitry used to control operation of the various components of the HDD 100. The electrical hardware board may include a printed circuit board on or in which the hardware and/or circuitry is mounted.

Figure 2A:
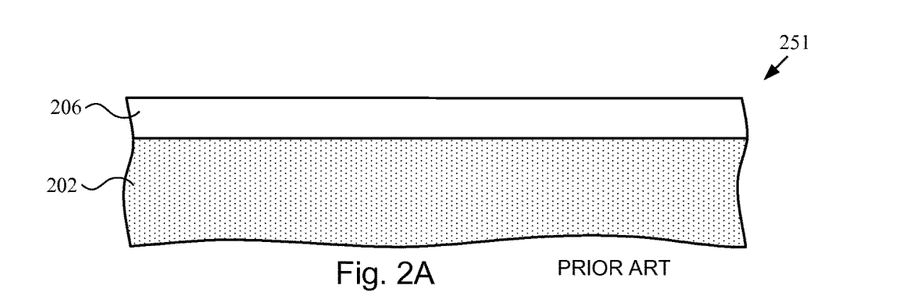
FIG. 2A is a cross-sectional side view of a conventional magnetic recording medium, according to one embodiment.

The disks 115 may be any of various types. Referring to FIG. 2A, generally each magnetic medium 251 (e.g., disk 115) includes a substrate 202 and a magnetic material 206. For example, the magnetic material 206 of the disks 115 may be conventional granular magnetic recording disks that are wafers that have magnetic layer bits with multiple magnetic grains on each bit. In granular magnetic media, all of the bits are co-planar and the surface of the disk is substantially smooth and continuous. In one embodiment, each bit has a magnetic dipole moment that can either have an in-plane (longitudinal) orientation or an out-of-plane (perpendicular) orientation.

In order to increase the amount of information that can be stored on a granular magnetic disk, the bit size may be decreased while keeping the grain size the same. However, with smaller bits there are fewer grains on each bit, which decreases the signal to noise ratio (less signal, more noise). In order to maintain a better signal to noise ratio, methods have been developed that decrease both the bit size and the grain size, thus keeping the same number of grains on each bit. However, when the grains become too small, thermal fluctuations can cause the grains to spontaneously reverse polarity, thus resulting in unstable storage and a loss of information.

Bit-patterned disks are another example of magnetic media that can be implemented in magnetic storage devices 100. In bit-patterned media, the bits are physically etched into a surface using conventional lithographic and etching techniques. In contrast to granular magnetic recording media, bit-patterned media are topographically patterned with intersecting trenches and elevated bit islands. In some instances, the trenches are etched directly into a magnetic layer. In other instances, the physical patterns are etched into a substrate and then a magnetic layer is coated over the patterned substrate. Because of the physical separation between the elevated bit islands and the trenches, the width of each distinct bit island can be decreased in order to increase the areal bit density of the device while still maintaining a high signal-to-noise ratio and thermal stability.

The substrate 202, in one embodiment, is a type of semiconductor, such as silicon. In another embodiment the substrate 202 may include quartz, silicon dioxide, $SiO_2$, glass, aluminum alloy, nickel alloy, silicon alloy, and the like. If the magnetic recording medium is a bit-patterned medium, an inert filler material (not depicted) may be added between the physically formed bits of the substrate 202 (in the trenches) in order to create a substantially smooth surface so that the tops of the bits are coplanar with the surface of the filler material. In another embodiment the bit-patterned medium includes a substantially flat/continuous substrate upon which the magnetic layer(s) 206 are applied before etching so that the pattern of trenches and/or islands is formed directly into the magnetic material itself.

In one embodiment, the magnetic layer 206 may actually include multiple different magnetic layers and/or multiple types of magnetic layers. For example the magnetic layer 206 may include two magnetic layers spaced apart by a non-magnetic intermediate layer. It is also contemplated that more than two magnetic layers may comprise the magnetic recording medium of the present disclosure and that more than one intermediate layer may space apart the multiple magnetic layers.

In one embodiment, each magnetic layer 206 includes a single metallic component and in other embodiments each magnetic layer 206 includes metallic alloys and/or multiple metallic components. Typical materials that comprise a magnet generally include iron, cobalt, nickel, and alloys thereof. Ferromagnetic alloys also may include oxides, platinum group metals (e.g. ruthenium, rhodium, palladium, and platinum), transition metals, and the like. The composition of the magnetic layers, whether consisting of a single component or a metallic alloy mixture, may be selected according to the specifics of a given application.

Throughout the present disclosure, the term "magnetic layer" may refer to a layer made from any ferromagnetic material that has the characteristics of a permanent magnet (i.e. a material that, in pertinent part, exhibits a net magnetic moment in the absence of an external magnetic field). Magnetism is the result of moving electric charge. For example, the spin of an electron in an atom or a molecule creates a magnetic dipole. A magnetic field is created when the magnetic dipoles in a material result in a net magnitude and direction. Thus, the magnetism of a material is directly related to the magnitude, direction, inter-alignment, and interaction of the magnetic dipoles in the material. For example, when an external magnetic field is applied over a piece of iron, adjacent dipoles generally align in the direction of the magnetic field and substantially remain aligned in the same direction even after the external field is removed, thus creating a net magnetic moment. The term "magnetic layer" may also refer to magnetic conditioning sub-layers that stabilize and otherwise improve the magnetic functions of the HDD. Additional details regarding the magnetic layer 206 are included below with reference to FIG. 2C.

Figure 2B:
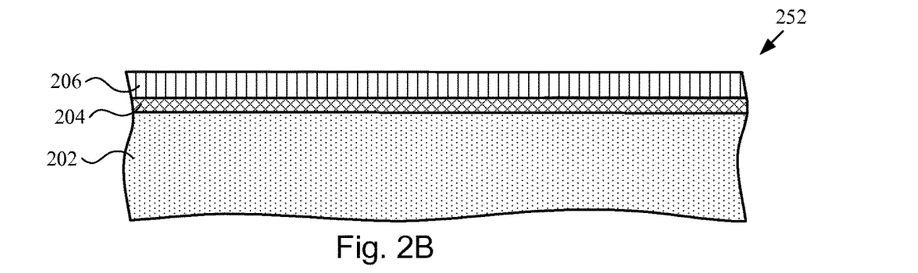
FIG. 2B is a cross-sectional side view of a magnetic recording medium with an insulation layer between a substrate and a magnetic layer, according to one embodiment.

FIG. 2B is a cross-sectional side view of a magnetic recording medium 252 with an insulation layer 204, according to one embodiment. As briefly described above, the insulation layer 204 is applied onto the substrate 202. When positioned directly or indirectly between the substrate 202 and the magnetic layer 206, the insulation layer 204 generally inhibits redox corrosion of the magnetic recording medium 252. As used herein, the term "redox" refers to chemical reactions that involve the transfer of electrons between species. In other words, the insulation layer 204 has an electrical resistivity that prevents, or at least inhibits, electron transfer between the substrate 202 and the magnetic layer 206. For example, without an insulation layer 204 between the substrate 202 and the magnetic layer 206 (like conventional HDDs), various constituents of the substrate 202 and/or trace impurities in the substrate 202 may react with the magnetic layer 206, thereby causing corrosion byproducts to form within the magnetic layer 206 or on the surface of the magnetic layer 206. These corrosion byproducts negatively affect the functionality and operation of the magnetic recording medium by, for example, diminishing the magnetic stability of the magnetic layer and/or causing the read-write head to crash into the corrosion byproducts formed on the surface the magnetic layer, among other negative side-effects. Accordingly, as described in greater detail below with reference to FIG. 3, the insulation layer 204 inhibits such redox reactions and thereby promotes the magnetic and operational stability of the HDD.

In one embodiment, the thickness of the insulation layer 204 is between about 1 nanometer ("nm") and 100 nm. In one embodiment, the insulation layer 204 has an electrical resistivity of at least 1,000 Ohm*cm. In another embodiment, the electrically resistivity of the insulation layer 204 may be dependent on the thickness of the layer for certain thickness thresholds. In other words, the electrical resistivity may change with the thickness of the insulation layer 204 when the thickness of the layer is less than 100 nm. For example, an insulation layer 204 that has a comparatively greater thickness (e.g., 100 nm) may have an electrical resistivity of greater than 1,000,000 Ohm*cm and an insulation layer 204 that has a comparatively smaller thickness (e.g., 5 nm) may have an electrical resistivity of about 1,000 Ohm*cm. The insulation layer 204 may be made from various materials, including diamond-like carbon film and/or silicon nitride films.

Figure 2C:
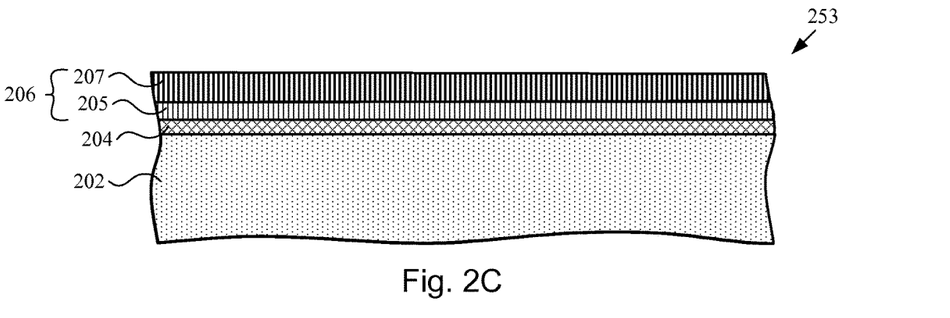
FIG. 2C is a cross-sectional side view of the magnetic recording medium with the magnetic layer having a magnetic conditioning sub-layer and a magnetic recording sub-layer, according to another embodiment.

FIG. 2C is a cross-sectional side view of a magnetic recording medium with the magnetic layer 206 having a magnetic conditioning sub-layer 205 and a magnetic recording sub-layer 207, according to another embodiment. As described above, the magnetic layer 206 may include multiple sub-layers. For example, the magnetic layer 206 may include more than one magnetic conditioning sub-layer 205 and more than one magnetic recording sub-layer 207. As used herein, the term "sub-layer" does not necessarily refer to a region that is below or beneath another region. In other words, the term "sub-layer" merely refers to a constituent layer, regardless of physical position with respect to other constituent layers, of the magnetic layer 206. The magnetic recording sub-layer 207 is the portion of the magnetic layer 206 that stores information in the form of magnetic dipole moments. Accordingly, the magnetic recording sub-layer 207 is analogous to the magnetic layer 206 generally described above with reference to FIG. 2A. In other words, the term magnetic recording sub-layer 207 is used herein to refer to the medium that is actually storing the data while the term magnetic conditioning sub-layer 205 refers to materials that affect the storage and recording of information in the magnetic recording sub-layer 207.

The magnetic conditioning sub-layer 205 may be a single material or may include multiple materials and components. In one embodiment, the magnetic conditioning sub-layer 205 facilitates the application of the magnetic recording sub-layer 207 onto the magnetic recording medium 253. In another embodiment, the magnetic conditioning sub-layer 205 may be used for other purposes, such as for subsequent processing and coating/application steps. In one embodiment, the magnetic conditioning sub-layer 205 includes at least one layer specifically configured to influence the magnetic anisotropy of a subsequently applied magnetic recording sub-layer(s) 207. For example, a nano-scale nucleation layer, such as NiTA or tantalum oxide ("$Ta_2O_5$"), may constitute at least a portion of the magnetic conditioning sub-layer 205. Such layers reduces the intrinsic switching field of certain magnetic layers, such as cobalt-platinum-chromium alloy layers. The magnetic conditioning sub-layer 205 may also include magnetic metals, magnetic alloys (not used for recording information), non-magnetic metal alloys, and the like. For example, alloys of nickel and refractory metals, such as tungsten and tantalum, may constitute a portion of the magnetic conditioning sub-layer 205. Such alloys are well-suited for controlling the crystallographic properties and the magnetic axis orientation of subsequent magnetic recording layers. Additionally, the magnetic conditioning sub-layer 205 may further be used to prevent inadvertent magnetic moment switching caused by stray magnetic fields (i.e., adjacent track exposure).

Accordingly, the term "magnetic conditioning sub-layer" refers to any material that is adjacent to the magnetic recording sub-layer(s) 207 and that magnetically affects the magnetic recording sub-layer 207. Depending on the thickness and composition of the magnetic recording sub-layer 207 and the thickness and composition of the other layers of a magnetic recording medium, various magnetic configurations may be created by using different magnetic condition layers 205.

Figure 2D:
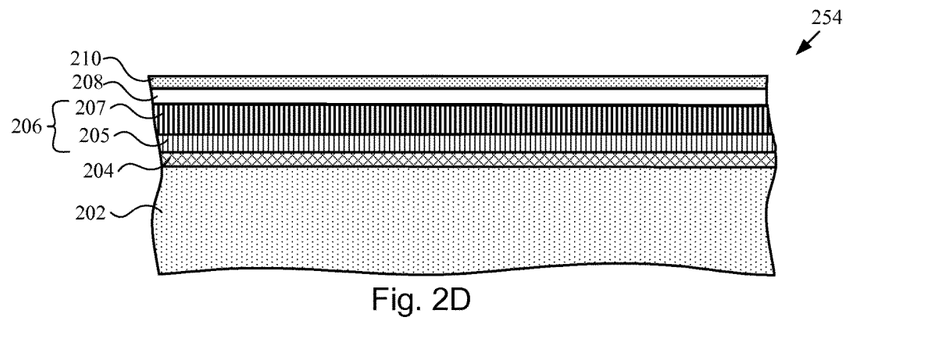
FIG. 2D is a cross-sectional side view of a magnetic recording medium with a protective layer and a lubricant layer, according to yet another embodiment.

FIG. 2D is a cross-sectional side view of a magnetic recording medium 254 with a protective layer 208 and a lubricant layer 210, according to yet another embodiment. The protective layer 208 can be made from any of various suitable materials known in the art, such as, but not limited to, a carbon mixture, such as carbon mixed with hydrogen and/or nitrogen, silicon carbide, silicon nitride, carbon nitride and/or silicon oxynitride.

As the transducer head 110 moves over the disk 115, or as the disk 115 rotates under the transducer head 110 (referring to FIG. 1), the transducer head 110 is spaced-apart a predetermined distance FH, i.e., flying height, relative to the disk 115 such that the transducer head 110 does not regularly contact the disk 115. The interactions of the exterior surface of the disk 115 with interfacing material such as the head 110, as well as the triboligical interactions of the exterior surface of the disk 115 with environment within the HDD 100, may result in damage to the disk (i.e., wear). Major types of wear include abrasion and friction from the head 110 contacting the disk 115. When an insulation layer 204 is not implemented, corrosion byproducts may migrate to the surface of the disk 115, thus causing further damage and wear. In other words, the protective layer 208 may provide a degree of protection from physical impacts or other physical wear, but the conventional protective layers 208 may not prevent migration of corrosion byproducts formed in conventional HDDs by redox reactions between the substrate 202 and the magnetic layer 206.

Even in certain applications where a lubricant layer 210 is deposited on the protective layer 208 of the disk, the lubrication layer 210 is generally not well suited for preventing migration of corrosion byproducts formed via internal redox reactions. Generally the lubricant layer 210 is used to reduce friction between the transducer head 110 and the exterior surface of the disk 115. In selecting the lubricant(s) for the lubricant layer 210, at least two performance parameters may be taken into account. First, the lubricant(s) selected should exhibit superior surface bonding characteristics. That is, a particular lubricant or a combination of lubricants should readily bond with the exterior surface of the disk 115 such that the lubricant layer 210 remains positioned on the exterior surface of the disk 115. Second, the lubricant or lubricant combination should also exhibit superior tribological characteristics. For example, a tribological characteristic found in a lubricant having superior tribological properties is the ability of the lubricant to replenish itself on areas on the exterior surface of the disk 115 where the lubricant has been removed due to contact between the transducer head 110 and the exterior surface of the disk 115. That is, when the lubricant layer 210 is disrupted by contact with the transducer head 110 and lubricant is removed from a particular area on the exterior surface of the disk 115, the lubricant or combination of lubricants should readily move to the location where the lubricant was removed.

In certain embodiments, the lubricant layer 210 may include a perfluoropolyethers ("PFPE") lubricant. PFPE's have a low surface tension and can be easily spread across the exterior surface of the disk 115. PFPE's are hydrophobic and repel water and have a strong bonding characteristic with carbon and therefore readily bond with the exterior surface of the disk 115. Additionally, PFPE's do not readily degrade, have a low vapor pressure, are thermally and chemically stable and are non-toxic and non-flammable. Examples of PFPE's include Fomblin Z, Fomblin Y, DuPont Krytox, and Demnum.

In certain embodiments, lubricants showing superior tribological properties include lubricants that do not exhibit phase separation, lubricants wherein the transducer head 110 does not readily pickup the lubricant, lubricants that exhibit low stiction/friction with the transducer head 110, and lubricants that protect the exterior surface of the disk 115 from corrosion from exterior sources. In other words, the protective layer 208 and the lubricant layer 210 may protect the disk 115 from physical damage and/or chemical corrosion caused by exterior elements. However, these layers do little to prevent internal galvanic corrosion and corresponding redox reactions that occur between the material internal to the protective layer 208.

Figure 3:
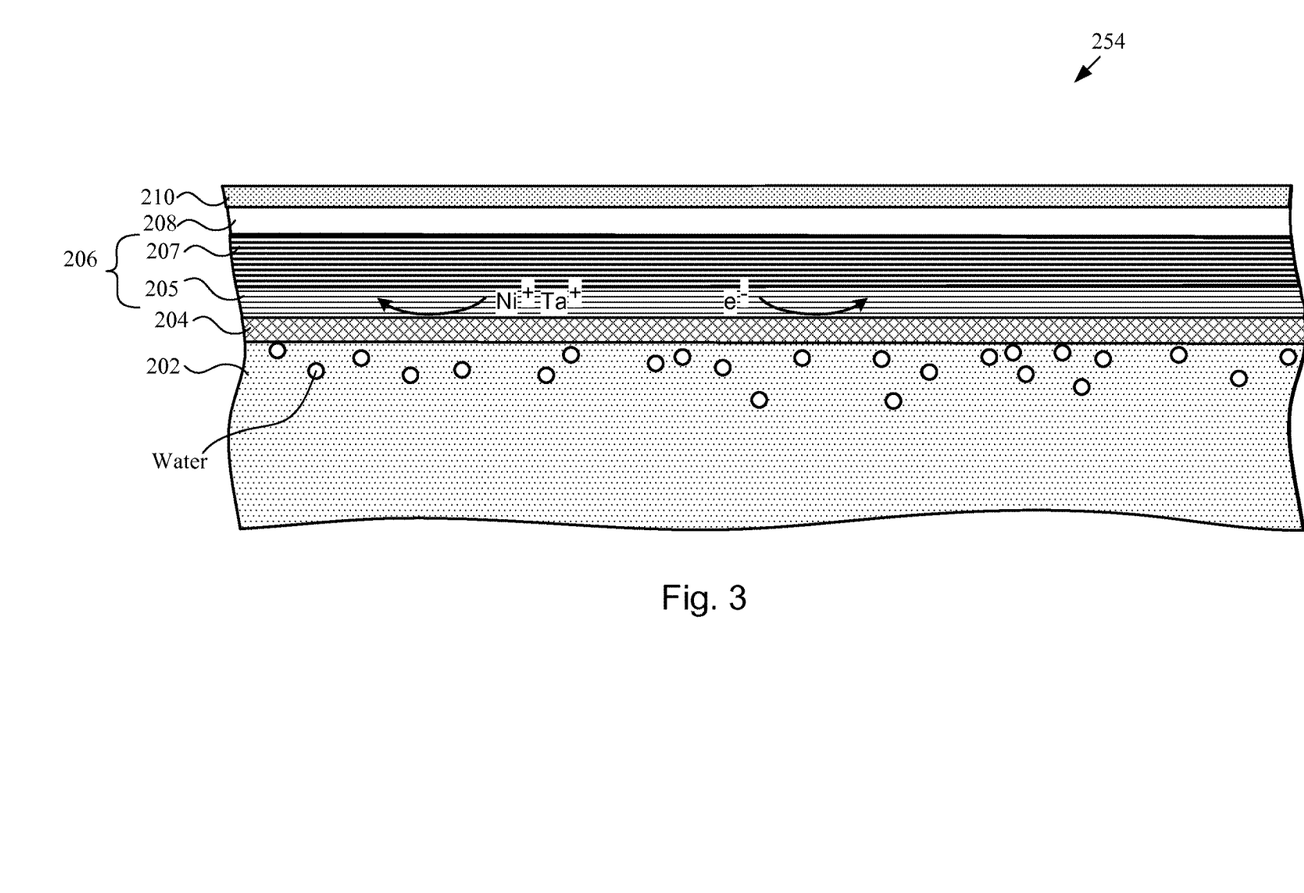
FIG. 3 is a cross-sectional side view of the magnetic recording medium of FIG. 2D schematically showing inhibition of redox reactions across an insulation layer of the magnetic recording medium, according to one embodiment.

FIG. 3 is a cross-sectional side view of the magnetic recording medium 254 schematically showing inhibition of redox reactions across the insulation layer 204 of the magnetic recording medium, according to one embodiment. In one embodiment, one or more of the substrate 202 and the magnetic layer 206 may include trace impurities. For example, the substrate 202 may have water molecules adsorbed to the surface of the substrate 202. These water molecules may be the result of excessive humidity and, in the absence of the insulation layer 204, the water molecules may react with the magnetic layer 206 (the magnetic conditioning sub-layer 205 and/or the magnetic recording sub-layer 207) to change the oxidation state of the various constituents involved with the redox reaction and thereby produce corrosion byproducts. For example, oxygen may be eluted/extracted from the water molecules, thus promoting a galvanic corrosion current (i.e., the transfer of electrons) between the magnetic layer 206 to the substrate 202 (or vice-versa) and resulting in the formation of corrosion byproducts. As described above, these corrosion byproducts are likely to negatively affect the operational stability of the magnetic recording medium. However, by applying the insulation layer onto the substrate 202 between the substrate 202 and the magnetic layer 206, the galvanic corrosion current is restricted and electron transfer between the substrate 202 and the magnetic layer 206 is inhibited, thereby preventing (or at least reducing) the formation of corrosion byproducts.

Figure 4:
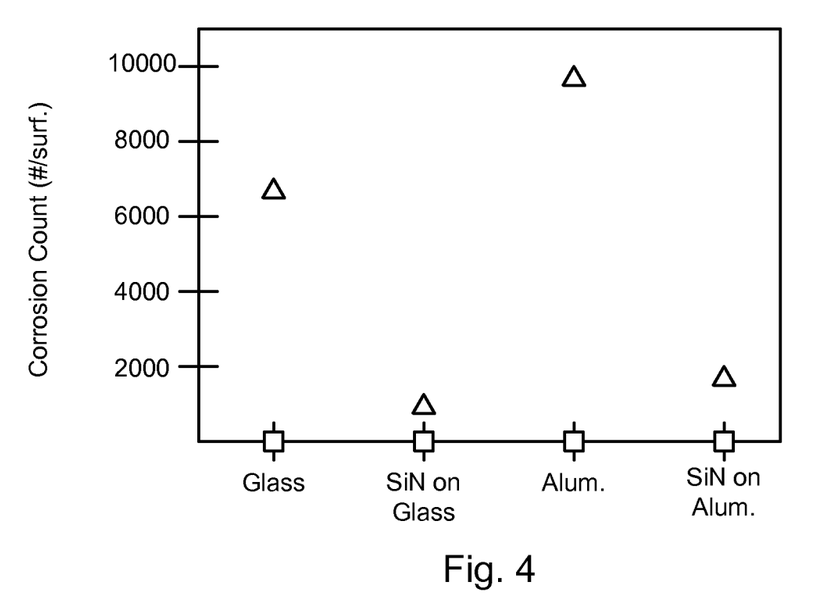
FIG. 4 is a chart showing a comparison of corrosion byproducts produced on a magnetic recording medium with and without an insulation layer.

FIG. 4 is a chart showing a comparatively reduced number of corrosion byproducts as a result of implementing the insulation layer 204 on a magnetic recording medium. According to one specific example, four different magnetic disks were prepared. All of the samples had a 3.5 inch substrate, two of which were made from glass and two of which were made from aluminum. One of the glass substrates had a magnetic layer directly applied on top of the substrate and the other glass substrate had a 5 nm insulation layer applied between the substrate and the magnetic layer. The same configuration was true for the two aluminum substrate samples. Initially, each sample was analyzed to determine the number of corrosion byproducts. Such an analysis involved SEM and TEM observations. All of the samples had an initial corrosion byproduct count of essentially zero (see square data points on the chart in FIG. 4).

The samples were then subjected to 6 cycles of environmental testing at 25 degrees Celsius under controlled humidity conditions. Each cycle lasted for 24 hours. After the environmental testing, the two samples that had no insulation layer showed a substantially higher count of corrosion byproducts than the samples that had an insulation layer between the substrate and the magnetic layer (see the triangle data points in the chart in FIG. 4).

Figure 5:
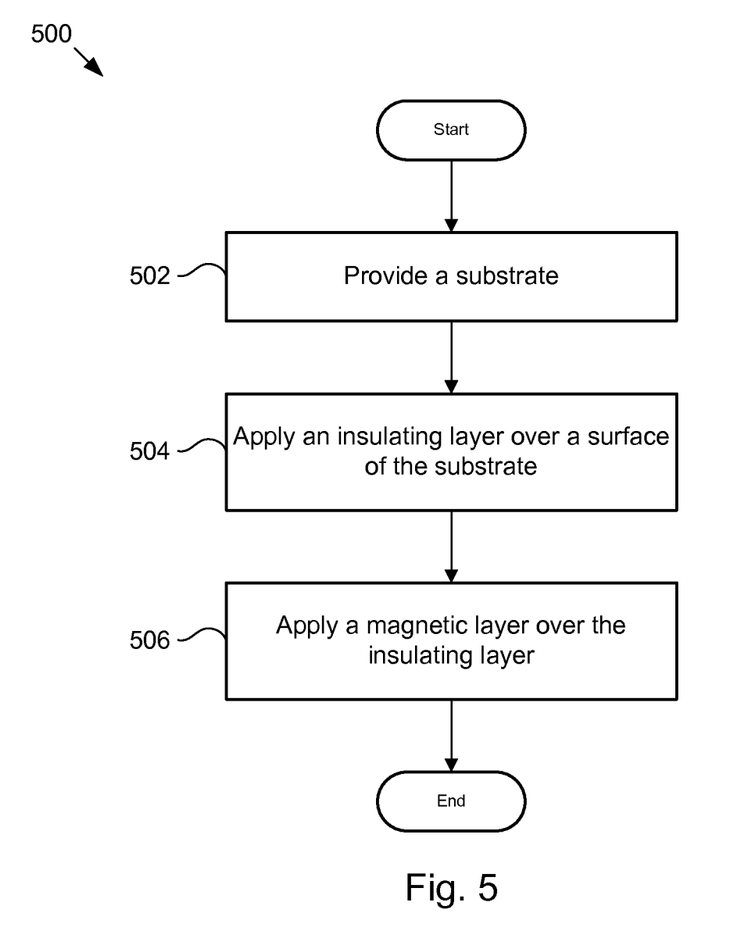
FIG. 5 is a schematic flowchart diagram of a method for manufacturing the magnetic recording medium, according to one embodiment.

FIG. 5 is a schematic flowchart diagram of a method 500 for manufacturing the magnetic recording medium, according to one embodiment. The method 500 includes providing a substrate at 502, applying an insulation layer over a surface of the substrate at 504, and applying a magnetic layer over the insulation layer, wherein the insulation layer inhibits redox corrosion of the magnetic recording medium, at 506. In one implementation, applying the magnetic layer over the insulation layer first includes applying a magnetic conditioning sub-layer over the insulation layer and then applying a magnetic recording sub-layer over the magnetic conditioning sub-layer. In one embodiment, a cleaning/planarizing step may be performed before applying the insulation layer at 504. This cleaning/planarization step may be performed under a vacuum and/or may be performed in a rare/noble gas environment. Additionally, a cleaning/planarizing step may also be performed on the insulation layer.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

In the above description, certain terms may be used such as "top," "bottom," "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, a "top" surface can become a "bottom" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Also, securing one element to another element can include direct and indirect securing. Additionally, as used herein, "adjacent" does not necessarily denote contact (i.e., one element can be adjacent to another without being in contact with the other).

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The subject matter of the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A magnetic recording medium, comprising:
    a substrate consisting of non-magnetic materials;
    an insulation layer applied directly onto a surface of the substrate, wherein:
        the insulation layer is made from a redox-corrosion-inhibiting material;
        the insulation layer is flat and planar;
        a thickness of the insulation layer is about 100 nanometers; and
        the insulation layer has an electrical resistivity of at least 1,000,000 Ohm*cm;
    a magnetic recording sub-layer disposed on a side of the insulation layer opposite the substrate, the magnetic recording sub-layer comprising a first material composition; and
    a magnetic conditioning sub-layer applied between the insulation layer and the magnetic recording sub-layer, the magnetic conditioning sub-layer being positioned adjacent to the magnetic recording sub-layer and comprising a second material composition different from, and influential on a magnetic property of, the first material composition of the magnetic recording sub-layer;
    wherein the magnetic conditioning sub-layer comprises at least one of NiTa or $Ta_2O_5$.

2. The magnetic recording medium of claim 1, wherein the magnetic conditioning sub-layer comprises a nano-scale nucleation layer.

3. The magnetic recording medium of claim 1, wherein the redox-corrosion-inhibiting material comprises at least one of a diamond-like carbon film and a silicon nitride film.

4. The magnetic recording medium of claim 1, wherein the insulation layer inhibits redox corrosion by inhibiting electron transfer through the insulation layer.

5. The magnetic recording medium of claim 1, wherein the insulation layer inhibits oxygen extraction across the insulation layer from trace water adhering to the substrate.

6. The magnetic recording medium of claim 1, wherein the insulation layer inhibits oxidation of at least one of the magnetic conditioning sub-layer and the magnetic recording sub-layer.

7. A method for manufacturing a magnetic recording medium, comprising:
    providing a substrate consisting of non-magnetic materials;
    applying an insulation layer directly onto a surface of the substrate, wherein:
        the insulation layer is made from a redox-corrosion-inhibiting material;
        the insulation layer is flat and planar;
        a thickness of the insulation layer is about 100 nanometers; and
        the insulation layer has an electrical resistivity of at least 1,000,000 Ohm*cm;
    applying a magnetic recording sub-layer on a side of the insulation layer opposite the substrate, the magnetic recording sub-layer comprising a first material composition;
    applying a magnetic conditioning sub-layer between the insulation layer and the magnetic recording sub-layer, the magnetic conditioning sub-layer being adjacent to the magnetic recording sub-layer and comprising a second material composition different from, and influential on a magnetic property of, the first material composition of the magnetic recording sub-layer; and
    resisting transfer of electrons between the magnetic recording sub-layer and the substrate;
    wherein the magnetic conditioning sub-layer comprises at least one of NiTa or $Ta_2O_5$.

8. The method of claim 7, wherein applying the magnetic conditioning sub-layer facilitates applying the magnetic recording sub-layer.

9. The method of claim 7, further comprising planarizing the substrate before applying the insulation layer.

10. The method of claim 7, further comprising planarizing the insulation layer before applying the magnetic conditioning sub-layer onto the insulation layer.

11. The method of claim 7, wherein the insulation layer inhibits electrical redox corrosion by inhibiting oxygen extraction across the insulation layer from trace water adhering to the substrate.

12. A hard disk drive comprising:
a substrate consisting of non-magnetic materials;
an insulation layer applied directly onto a surface of the substrate, wherein:
the insulation layer is made from a redox-corrosion-inhibiting material;
the insulation layer is flat and planar; and
a thickness of the insulation layer is between 5 nanometers and 100 nanometers;
a magnetic layer comprising a magnetic conditioning sub-layer applied onto the insulation layer and a magnetic recording sub-layer applied onto the magnetic conditioning sub-layer, the magnetic recording sub-layer comprising a first material composition and the magnetic conditioning sub-layer comprising a second material composition different from, and influential on a magnetic property of, the first material composition of the magnetic recording sub-layer;
water molecules adsorbed to the surface of the substrate, wherein the insulation layer restricts galvanic corrosion current, caused by the water molecules, between the magnetic layer and the substrate;
a protective layer applied onto the magnetic layer; and
a lubrication layer applied onto the protective layer;
wherein the magnetic conditioning sub-layer comprises at least one of NiTa or $Ta_2O_5$.

13. The hard disk drive of claim 12, wherein the insulation layer has an electrical resistivity of at least 1,000 Ohm*cm.

14. The hard disk drive of claim 12, wherein the redox-corrosion-inhibiting material comprises at least one of a diamond-like carbon film and a silicon nitride film.

15. The hard disk drive of claim 12, wherein the insulation layer inhibits redox corrosion by inhibiting electron transfer through the insulation layer.

16. The hard disk drive of claim 12, wherein the insulation layer inhibits oxygen extraction across the insulation layer from trace water adhering to the substrate.

17. The hard disk drive of claim 12, wherein the insulation layer inhibits oxidation of the magnetic layer.

18. The magnetic recording medium of claim 1, wherein the magnetic conditioning sub-layer influences a magnetic anisotropy of the magnetic recording sub-layer.

19. The magnetic recording medium of claim 1, wherein the magnetic conditioning sub-layer at least one of reduces an intrinsic switching field of the magnetic recording sub-layer, influences a crystallographic property of the magnetic recording sub-layer, influences a magnetic axis orientation of the magnetic recording sub-layer, and reduces magnetic moment switching in the magnetic recording sub-layer.

* * * * *